US010257168B2

(12) United States Patent
Jäger

(10) Patent No.: US 10,257,168 B2
(45) Date of Patent: Apr. 9, 2019

(54) SYSTEM AND METHOD FOR SECURING TELECOMMUNICATIONS TRAFFIC DATA

(71) Applicant: UNISCON UNIVERSAL IDENTITY CONTROL GMBH, Munich (DE)

(72) Inventor: Hubert Jäger, Pullach (DE)

(73) Assignee: Uniscon Universal Identity Control GmbH, Munich (DE)

(*) Notice: Subject to any disclaimer, the term of this patent is extended or adjusted under 35 U.S.C. 154(b) by 197 days.

(21) Appl. No.: 15/148,501

(22) Filed: May 6, 2016

(65) Prior Publication Data
US 2016/0255057 A1 Sep. 1, 2016

Related U.S. Application Data

(63) Continuation of application No. PCT/EP2014/074200, filed on Nov. 10, 2014.

(30) Foreign Application Priority Data

Nov. 9, 2013 (DE) .................. 10 2013 112 341

(51) Int. Cl.
H04L 29/06 (2006.01)
H04L 9/08 (2006.01)
(Continued)

(52) U.S. Cl.
CPC .......... *H04L 63/0428* (2013.01); *H04L 9/008* (2013.01); *H04L 9/0894* (2013.01);
(Continued)

(58) Field of Classification Search
CPC ... H04Q 7/24; H04Q 7/22; H04Q 7/32; G06F 12/00; H04M 15/00; H04M 3/533;
(Continued)

(56) References Cited

U.S. PATENT DOCUMENTS 5,850,444 A * 12/1998 Rune ................... G06Q 20/027
380/30
5,915,222 A * 6/1999 Olsson ................. H04M 15/00
455/445

(Continued)

FOREIGN PATENT DOCUMENTS

WO 2004/109998 A1 12/2004

OTHER PUBLICATIONS

International Search Report issued for corresponding International Patent Application No. PCT/EP2014/074200 dated Nov. 2, 2015.

(Continued)

*Primary Examiner* — Thanhnga B Truong
(74) *Attorney, Agent, or Firm* — Myers Wolin, LLC

(57) ABSTRACT

A method and system are provided for securing telecommunications traffic data. A method is provided for transmitting messages via a telecommunications network between a number of subscribers by means of a telecommunications service, wherein the telecommunications service receives at least one first message of individual first size from at least one first subscriber to the telecommunications service that is intended for at least one second subscriber of the telecommunications service. In reaction to receiving a message, the telecommunications service sends at least one second message to the at least one second subscriber, wherein the at least one second message obtains a second size. The first size cannot be conclusively deduced from the second size.

7 Claims, 2 Drawing Sheets

(51) Int. Cl.
*H04L 9/00* (2006.01)
*H04L 9/32* (2006.01)
*H04W 12/02* (2009.01)

(52) U.S. Cl.
CPC .............. *H04L 9/32* (2013.01); *H04L 63/102* (2013.01); *H04L 63/1475* (2013.01); *H04L 63/308* (2013.01); *H04W 12/02* (2013.01)

(58) Field of Classification Search
CPC ... H04M 3/50; H04L 9/00; H04L 9/32; H04L 9/08; H04L 63/0428; H04L 9/008; H04L 9/0894; H04L 63/102; H04L 63/1475; H04L 63/3008; H04W 12/02
USPC ......... 713/168, 153; 370/338, 410; 711/170; 705/79; 455/466, 433; 380/30
See application file for complete search history.

(56) References Cited

U.S. PATENT DOCUMENTS

| | | | |
|---|---|---|---|
| 5,946,630 A * | 8/1999 | Willars | H04W 88/184 370/410 |
| 7,802,071 B2 * | 9/2010 | Oved | G06F 13/28 711/170 |
| 8,180,917 B1 | 5/2012 | Yan et al. | |

OTHER PUBLICATIONS

Kotzanikolaou, "Data Retention and Privacy in Electronic Communications", vol. 6, No. 5, pp. 46-52, IEEE Computer Society, Los Alamitos, CA (US), Sep. 1, 2008.

* cited by examiner

SYSTEM AND METHOD FOR SECURING TELECOMMUNICATIONS TRAFFIC DATA

CROSS REFERENCE TO RELATED APPLICATIONS

This application is a continuation of International Application No. PCT/EP2014/074200, filed on Nov. 10, 2014, which claims priority to German Application No. 10 2013 112 341.4, filed Nov. 9, 2013, the contents of each of which are incorporated by reference herein.

TECHNICAL FIELD

The invention relates to a system and a method for securing telecommunications traffic data which upon use of a telecommunications service by a number of subscribers of the telecommunications service is incurred by the telecommunications service provider of the telecommunications service.

BACKGROUND

In several countries, for example, the Federal Republic of Germany, data which may be related or which is related to individuals is stored by or for all locations during data preservation without the data being currently required. The purpose of such data preservation is intended to be an improved possibility of prevention and prosecution of crimes. For this, the data has to be stored over a certain time period in order to be available, for example, for the purpose of criminal prosecution. Usually, data preservation is carried out by the provider or service provider of a telecommunications service.

In order to ensure that the provider of the telecommunications service does not have unauthorized access to the traffic data of its customers in order to, for example, create personality profiles, it is known to store the traffic data in a secured environment, and to encrypt it prior to storing. The secured environment also is referred to as sealed infrastructure. The secured environment or sealed infrastructure thus prevents that neither the provider of the infrastructure nor the service provider of the telecommunications service or other third parties are able to access this data. Further, it is known to encrypt the telecommunications data or connection data with two different encryption keys, wherein either one of the two keys is deposited at a trustworthy instance, for example, a notary. Thereby, an unauthorized access to the connection or traffic data is prevented more efficiently, because for the access, the key being deposited at the trustworthy instance is required in any case.

In order to also prevent (payload)data exchanged between the subscribers of a telecommunications service, for example, electronic messages or electronic documents, from being accessed by the telecommunications service provider or other third parties without authorization, it is known to also encrypt the data received by a subscriber such that only those subscribers may access the data for whom the data is intended. The encryption keys as well as the decryption keys may be stored in the secured environment mentioned above. Thereby, it is ensured that neither the telecommunications service provider nor other third parties have access to the traffic data or to the payload. An unauthorized evaluation, for example, of traffic data in the course of a grid investigation, thereby, is efficiently prevented as far as, for example, no judicial order exists permitting the use of the key deposited at a trustworthy instance, as a notary.

This method for securing traffic data and payload known from prior art, however, has the disadvantage that even if the subscribers of a telecommunications service exchange data amongst them via secured, for example, encrypted communications connections, the telecommunications service provider has the possibility only from observing the data traffic, to deduce information on who communicates with whom. This information may be obtained by the telecommunications service provider even if the communication between the subscribers and the telecommunications service is carried out encrypted, because for the information on who communicates with whom, the content of the data being exchanged between the subscribers is not required.

Thus, it is possible to deduce from the comparison of the size of messages being received by the telecommunications service and then being transmitted further, the sender and recipient, even if sender and recipient cannot be derived together in the individual messages, because they are not comprised in the messages at all, or, for example, only in encrypted form. This will be explained by means of a simple example. If a first subscriber does not send an electronic document (first message) in encrypted form to a second subscriber directly to the second subscriber, but rather deposits it in an environment protected against external access, from where the document then is forwarded as second message to the second subscriber also in encrypted form, only by comparison of sizes of the messages being input in and being output from the secured environment, a certain assignment can be made, and from this, the sender and recipient of the messages can be deduced. Hereby, it does not help if, e.g., the recipient (second subscriber) is comprised in the first message only in encrypted form, and in the second message (first subscriber), only the sender is comprised in an encrypted manner.

Further, the problem described above gets worse, if, after receipt of a (first) message, for example, an electronic document, from a subscriber, the telecommunications service informs that subscriber for whom the message is designated on the existence of a message designated to him by means of a further message. Because the data exchange between the subscribers and the telecommunications service itself is always "visible" for the telecommunications service provider, the telecommunications service provider may deduce, as described above, from the fact that a message has been deposited for a certain subscriber by a subscriber, and the subscriber for whom the message was designated has been informed on the existence of the message, the information that the two subscribers communicate with each other, even if the data exchange takes place in an encrypted manner, and if the subscriber, for whom the message was designated, does not request it from the telecommunications service.

Thus, the methods for data preservation known from prior art, although fulfilling high security standards, are not sufficiently protected and secured so as efficiently prevent the possibility of an unauthorized evaluation of telecommunications traffic data.

SUMMARY

Therefore, it is an object of the invention to provide a system and a method for securing telecommunications traffic data which is incurred during use of at least one telecommunications service by a number of subscribers at the telecommunications service provider of the telecommunications service, which effectively and efficiently prevent an unauthorized access or abuse of telecommunications traffic data.

This object is solved by a method and a system for securing telecommunications traffic data according to the independent claims. Preferred embodiments and further developments are specified in the respective independent claims.

Thus, a method for transmitting messages amongst a number of subscribers by means of a telecommunications service via a telecommunications network is provided, wherein the telecommunications service receives at least a first message of an individual first size of at least one first subscriber of the telecommunications service, which is designated for at least one second subscriber of the telecommunications service, and in response to the receipt of a message, the telecommunications service sends a second message to the at least one second subscriber, wherein the at least one second message obtains a second size being related to the first size, which is irreversibly unique.

The at least one second message comprises the same payload as the first message.

If several second messages are generated, these several second messages together comprise the same payload as the first message.

The second subscriber thus, upon receipt of one or more second messages, receives the message designated for him. The term message also is used for data files or other information which can be sent electronically.

Hereby, the relation may represent a mapping rule according to which each size is mapped into a size category from a predetermined number of size categories, wherein each size category comprises more than one first size, and the second size receives a value from that size category, to which the first size is mapped, wherein, in particular, the value corresponds to the maximum value skmax of the size category.

The number of the size categories may be one, and the value may correspond to the maximum size of the first message.

It is advantageous, if address information with respect to the at least one second subscriber is only assigned to the first message in encrypted form, which preferably only the telecommunications service may decrypt.

It is also preferable, if information with respect to the first subscriber is assigned to the second message only in encrypted form, which preferably only the second subscriber may decrypt.

It is also preferable, if the telecommunications service operates in a secured environment.

It is also preferable, if the first message is encrypted in a homomorphous manner, and the second message preferably is also encrypted in a homomorphous manner, wherein the encryption preferably is not modified by the telecommunications service.

It is also preferable, if the at least one second message comprises the same payload as the at least one first message.

Also a method for securing telecommunications traffic data is provided, which during use of at least one telecommunications service by a number of subscribers is incurred by a telecommunications service provider of the telecommunications service, wherein the telecommunications service uses the method as described above.

Further, also a data processing system is provided, which is configured for execution of a method as described above.

In this manner, it is also ensured that the sizes of the first messages and the respective second messages do no longer correlate to each other such that it is no longer possible to deduce, by observing the sizes of the first and the second messages, the sender or the recipient.

Further preferred embodiments are obtained, if also the temporal relation between the first and the second messages is cancelled.

Accordingly, there is further provided a method for securing telecommunications traffic data, which during use of at least one telecommunications service by a number of subscribers is incurred at the telecommunications service provider of the telecommunications service, wherein the telecommunications service receives a message of at least one first subscriber of the telecommunications service, which is designated for at least one second subscriber of the telecommunications service, and wherein, in addition to the embodiments described above, prior to sending the second message, the telecommunications service, in response to the receipt of the message, sends a notification to the at least one second subscriber, wherein a predetermined time delay is provided between the receipt of the message and the sending of the notification.

It is, in turn, advantageous, if the telecommunications service is executed in a secured environment (sealed infrastructure).

By executing the telecommunications service in a secured environment or sealed infrastructure, it is ensured that the telecommunications service provider of the telecommunications service does not have access to the data being incurred at the telecommunications service. In order to neither be able to deduce any information on who communicates with whom from the data traffic between the subscribers and the telecommunications service, the time delay between the receipt of a message and the sending of the notification is provided. Thereby, it is prevented that it may be determined who communicates with whom on the basis of a temporal correlation between the receipt of a message and the sending of a notification. Due to the time delay, it is prevented that a notification may be assigned to a received message such that also the sender of a message cannot be assigned to the recipient of the notification.

It is preferable, if the time delay between the receipt of the message and the sending of the notification are selected depending on the data traffic per time unit between the subscribers of the telecommunications service and the telecommunications service. Thereby, the time delay or the sending of the notification may be adapted to the capacity of the telecommunications service preferably dynamically.

It has been found to be specifically advantageous, if the time delay is smaller for high data traffic per time unit than for low data traffic per time unit.

Because with high data traffic per time unit usually messages are received by the telecommunications service from a large number of subscribers, and thereby also notifications are sent to a large number of subscribers, the time delay may be reduced without offering the possibility to the telecommunications service provider to deduce information on who communicates with whom on the basis of a temporal correlation between the receipt of the messages and the sending of the notifications. With low data traffic per time unit, the telecommunications service usually receives only messages from a low number of subscribers, and therefore also only sends a corresponding notification to a low number of subscribers. In order to also prevent a temporal correlation between the receipt of the messages and the sending of the notifications for this case, the time delay is increased correspondingly.

According to an embodiment the time delay is selected randomly from a time delay interval. The time delay may be selected for a predetermined number of notifications to be sent randomly from a time delay interval. Alternatively, the time delay may also be selected for each notification to be sent randomly from a time delay interval.

This provides the advantage that by means of a temporal analysis of incoming and outgoing data traffic, a determination of the actual time delay is prevented efficiently, the latter possibly enabling the telecommunications service provider, with knowledge of the actual time delay, to deduce a temporal correlation between the received messages and the notifications sent, from which the telecommunications service provider could deduce information on who communicates with whom. The interval limits may be fixed.

However, it is advantageous, if the interval limits of the time delay interval are selected depending on the data traffic per time unit between the subscribers and the telecommunications service. Thereby, not only the time delay is selected from the time delay interval randomly, but rather also the time delay interval is adapted to the data traffic such that the determination of the actual time delay is even further impeded for the telecommunications service provider or an unauthorized third party.

The time delay ($\delta t$) respectively may be selected for a predetermined number of notifications or for each notification differently.

According to a preferred embodiment, the data traffic per time unit comprises the number of received messages per time unit. Thereby, it is prevented that for a low number of received messages per time unit causing, for example, due to very large messages high data traffic, the time delay is selected too small, possibly enabling a temporal correlation between the received messages and the notifications sent due to the low number of received messages and the notifications sent.

According to an embodiment, the telecommunications service may comprise a notification service, which triggers the notification to the at least one second subscriber and the time delayed sending of the generated notification, wherein the time delay is determined by the notification service.

According to an embodiment, the notification is sent to the at least one second subscriber, if the second subscriber is registered with the telecommunications service. It may also be provided for no notification being sent to the second subscriber, if the subscriber is not registered with the telecommunications service. It may also be provided for sending no notification to the second subscriber, after this second subscriber has registered with the telecommunications service. Thereby, an even better de-correlation is achieved, i.e., the assignment of a notification to a received message may be even further impeded.

The notification may comprise data being adapted to output an acoustic and/or visual signal to the second subscriber signaling the presence of the message at the telecommunications service.

The notification of each subscriber may be identical. According to an embodiment, the notification may be sent in a non-encrypted manner. Because the notification is identical for each subscriber, it may also be sent in a non-encrypted manner, because no personal data may be deduced from the notification. Moreover, the sending of the notification in a non-encrypted manner has the advantage that no encryption has to be carried out by the telecommunications service, which would mean additional computing effort. The telecommunications service or the notification service generating the notification and sending it time-delayed, thus, may be executed substantially more efficiently and in a more resource-saving manner.

According to an embodiment, the message may be transmitted upon request by the second subscriber from the telecommunications service to the second subscriber. Because the notification is sent time-delayed with respect to the receipt of the message from the first subscriber to the second subscriber, also no information on the fact that the first subscriber communicates with the second subscriber may be deduced due to the request to transmit the message to the second subscriber by the second subscriber.

The method, moreover, has the advantage that the causality between the incoming messages and the notifications to be sent is canceled, making a deduction of the information on who communicates with whom impossible.

The transmission of the message from the first subscriber to the second subscriber (via the telecommunications service) may be carried out on the basis of an end-to-end encryption, i.e., the message is encrypted by the first subscriber and is decrypted by the second subscriber.

The message may be encrypted in a homomorphous manner.

Further, a system for securing telecommunications traffic data is provided, which, during use of at least one telecommunications service by a number of subscribers is incurred at the telecommunications service provider of the telecommunications service, wherein the telecommunications service is adapted to receive a message, which is designated for a second subscriber, from at least one first subscriber, and in response to the receipt of the message, to send a notification to the at least one second subscriber, wherein a predetermined time delay is provided between the receipt of the message and the sending of the notification.

It has been found to be advantageous, if the system comprises a secured environment, in which the telecommunications service is executable.

The telecommunications service may be adapted to select the time delay between the receipt of the message and the sending of the notification depending on the data traffic per time unit between the subscribers and the telecommunications service.

The telecommunications service may comprise a notification service being adapted to generate the notification to the at least one second subscriber, and to trigger the time-delayed sending of the generated notification, wherein the time delay is determined by the notification service.

Further, the inventive system may be further adapted to execute a method according to this disclosure.

BRIEF DESCRIPTION OF THE DRAWINGS

Details and features of the invention as well as concrete embodiments of the invention can be derived from the following description in connection with the drawing, in which.

DETAILED DESCRIPTION

By means of the system and the method according to this disclosure, an adequate data protection as well as also sufficiently good possibilities for data evaluation, for example, for investigation purposes, is enabled. Abuse of the stored data, in particular, of the telecommunications traffic data is efficiently prevented, wherein specifically no information on who communicates with whom may be deduced from the data traffic.

Figure 1:
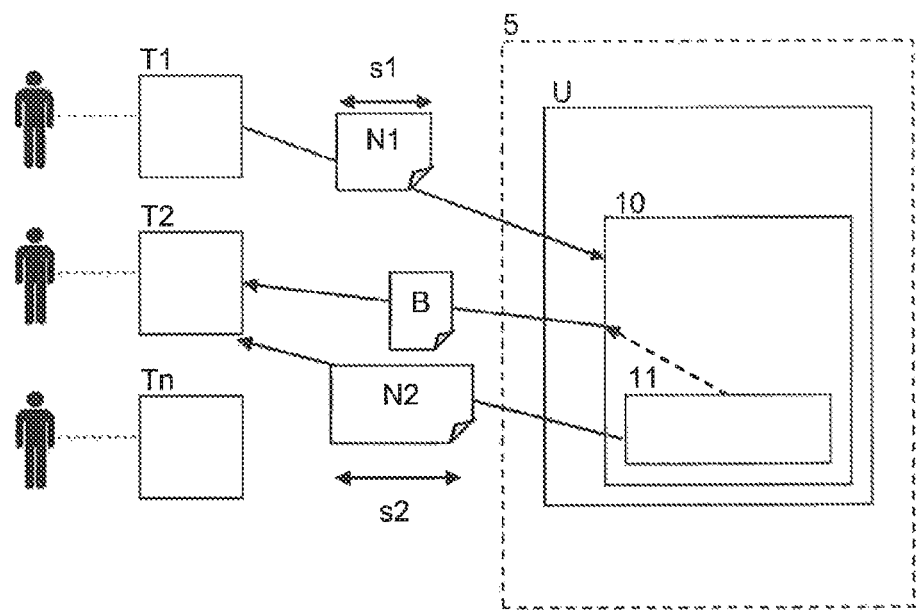
FIG. 1 shows a system for securing telecommunications traffic data for explaining the method for securing the telecommunications traffic data.

FIG. 1 shows a system for securing telecommunications traffic data, which is incurred during use of a telecommunications service 10 by a number of subscribers T1 to Tn.

A telecommunications service provider 5 provides a telecommunications service 10, which is executed in a secured environment U. For example, a message box may be provided by the telecommunications service 10, in which first subscribers T1 admitted to the message box may deposit messages for other second subscribers T2. A message may, for example, be generated directly in the message box or may be deposited in the message box via a communications network. Here, a first message N1 may be, for example, an electronic document or the like.

In the example shown in FIG. 1, a first message N1, for example, an electronic document, is transmitted from a first subscriber T1 to the telecommunications service 10, and is deposited there, for example, in a corresponding message box. The size s1 of the first message (electronic document, file or the like) N1 basically is arbitrary; different first messages also have individually different sizes. After receipt of the first message N1, the telecommunications service 10 generates at least one second message N2 in the secured environment U, which differs in its size s2 from the size of the first message N1. This second message then is sent from the telecommunications service 10 to the second subscriber T2. The at least one second message N2 comprises the same payload as the first message N1. Due to the different sizes of the first message N1 and the at least one second message N2, a possible assignment only by means of the size of these messages is lost. Thus, the information on who communicates in the telecommunications network via the telecommunications service 10 with whom is suppressed.

The second size s2 of the second message N2 is in an irreversibly unique relation M to the first size of the first message. This means that the size of the first message N1 may not unambiguously be deduced from the size of a second message N2.

Such a relation M is realized, for example, if each first message is increased to a uniform constant size, e.g., to the maximum admissible size smax in the telecommunications system. Because the latter, however, may burst the transmission capacity of the system, the first messages N1 are classified according to their size to different size categories. Each size category is defined by a minimum and a maximum value, thus, represents a size interval. Each size category is assigned to a respective value sk. The respective second message N2, as size s2 comprises the value sk of that category, into which the first size s1 of the first message is classified. As value sk for the respective category, the maximum value may be assumed. This is advantageous, because then, the first messages N1 assigned to the respective category only are increased during generation of the second message N2, but never have to be decreased. A reduction works too, however, this then requires the classification of the contents (payload) of the first message to several second messages N2.

The number L of the categories may be a variable. With respect to the network capacity, it is advantageous to select the number L large, thus, the intervals small, because then the individual messages do not have to be modified with respect to their size too much. This is possible, if many messages N1 are transmitted simultaneously, thus, the traffic is large, because then still enough messages N1 fall in each single category to thus conceal their origin. Due to the plurality of messages N1 of each size category, the assignment of the messages N2 to the messages N1 remains concealed.

According to a further embodiment, additionally a further temporal correlation of the received first messages N1 and the messages N2 sent is canceled. This is of particular interest (but not only), if the second subscriber T2 is to receive the second message N2 designated for him not immediately but rather only after notification.

According to a further embodiment, the telecommunications service 10, prior to the sending the second message N2, thus generates a notification B and sends the latter to the second subscriber T2 via the communications network. By means of this notification B, the second subscriber T2 is informed on a message N1 being deposited by the first subscriber T1 in the message box of the telecommunications service 10 for him.

According to an embodiment, the telecommunications service 10 comprises a notification service 11, which is responsible for the generation of the notification to the second subscriber T2 and for the sending of the notification.

All data incurred at the telecommunications service provider 5, i.e., traffic data and payload, are stored in the secured environment U and are processed, if needed. As explained at the beginning, the payload as well as the traffic data may be stored in the secured environment U in an encrypted, preferably double-encrypted manner. By the double-encryption, it is ensured that the telecommunications service provider 5 does not have access to the payload and traffic data. The encryption or double-encryption of the data is performed preferably within the secured environment U, wherein also the keys required for this are generated, stored, and managed in the secured environment U. The secured environment U is also referred to as sealed infrastructure, and prevents that neither the provider of the infrastructure nor the telecommunications service operator or telecommunications service provider 5 may access this data during the processing of the data.

For this, the secured environment U may comprise means for generating the necessary cryptographic keys not shown in FIG. 1. In order to prevent the encrypted connection data or payload encrypted by the telecommunications service provider 5 in the secured environment U being decrypted again easily by the latter by means of the corresponding decryption keys, it is advantageous to encrypt the encrypted data with a further encryption key again, and to deposit the thus double-encrypted data in a storage means of the secured environment U. The second encryption key may be handed over to a trustworthy instance, as a notary, who only is allowed to surrender it upon judicial order.

The secured environment U or the sealed infrastructure may comprise a number of redundant and distributed computing resources, which respectively may comprise a number of so-called Trusted Platform Modules (TPM), circuit breakers for interrupting the power supply of all computing resources, electro-mechanical locks, a number of sensors by means of which the access to the computing resources may be monitored. According to an embodiment, the computing resources may comprise storage means, in which the cryptographic keys are stored, wherein according to an embodiment, the cryptographic keys are exclusively stored in volatile memory devices such that after an interruption of the power supply, the stored keys are deleted. The deletion of the cryptographic keys may be necessary, for example, if somebody without authorization has access to a computing resource. In order to be able to generate the keys again, it is advantageous, if the cryptographic keys are synchronized via a synchronization means with a further storage means for storing cryptographic keys.

The computing resources may be connected to a so-called sealing monitoring means (sealing control), which monitors the electro-mechanical components. In case the sealing monitoring means detects and unauthorized access to a computing resource, it may instruct an immediate synchronization of all keys stored in the computing resource, and may interrupt the power supply to the compromised computing resource after completion of the synchronization. Thereby, it is ensured that no decryption keys can be generated from a compromised computing resource.

The computing resources may further be coupled to a so-called Cloud Control, which is provided for executing the data exchange with one or more subscribers T. The Cloud Control may also be coupled to the sealing monitoring means such that the sealing monitoring means may also induce corresponding measures upon a detected intervention via a communications network.

The subscribers T1 to Tn of the telecommunications service 10 may be smartphones, tablet PCs, common computers or the like, wherein in the example shown in FIG. 1, one subscriber is respectively assigned to a user. As can be seen in FIG. 1, a data transmission is executed between the subscribers T1 and T2 and the telecommunications service 10, wherein data is transmitted from the first subscriber T1 to the telecommunications service 10, and data from the telecommunications service 10 to the second subscriber T2, i.e., data external of the secured environment U reaches the telecommunications service 10, or data from the telecommunications service 10 reaches a second subscriber T2 from out of the secured environment U.

Also, if the data transmission between the two subscribers T1, T2 and the telecommunications service 10 is carried out in an encrypted manner, the telecommunications service provider 5 obtains the information that the subscribers T1 and T2 are involved in a (common) communication. In order to avoid that the telecommunications service provider receives information that the first subscriber T1 communicates with the second subscriber T2 only on the basis of the data traffic (without having to know the content of the data sent or received for this), it is provided for the notification B being generated by the telecommunications service 10 or by the notification service 11, and is sent or transmitted to the second subscriber T2 in a time-delayed manner. By the time-delayed sending of the notification B, it is achieved that the telecommunications service provider 5 is not able to make any assignment between the received first message N1 and the sent notification B by means of the data traffic, and therefore may neither deduce the information from the traffic data that the subscriber T1 communicates with the subscriber T2. By the provision of a time delay between the receipt of the message N and the sending of the notification B, this traffic data being accessible from outside of the secured environment U is "concealed" such that neither for the telecommunications service provider 5 nor for an unauthorized third party it is obvious, who frequently communicates with whom.

According to an embodiment, also the notification B may be encrypted or transmitted in an encrypted manner. This is particularly advantageous, if the recipient of the first message N1 is to be notified by the confirmation message B, who has deposited the first message N1 for him, for example, in a message box, or which content is concerned with respect to the message deposited in the message box.

However, it has been found to be specifically advantageous, if only the information is transmitted to the recipient or to the second subscriber T2 by means of the notification B that a message has been deposited for him with the telecommunications service provider 5. If only the information that a message has been deposited is to be transmitted by the notification B, the notification B may be identical for all subscribers of the telecommunications service such that an encryption or an encrypted transmission of the notification B may be omitted. Thereby, the capacity of the system for the generation and sending of the notifications may be substantially reduced or minimized on the side of the telecommunications service provider.

According to an embodiment, it is sufficient, if the payload of the notification B only has a length of one bit, because for the purposes of signalizing to the second subscriber T2 that any arbitrary message has been deposited for him with the telecommunications service provider, one bit is sufficient. Thereby, the data volume for the transmission of notifications B to the subscribers of the telecommunications service may be reduced or minimized.

After receipt of the notification B, the second subscriber T2 may request the message N designated for him from the telecommunications service provider. The communication between the first subscriber T1 and the second subscriber T2, thereby, may be carried out on the basis of an end-to-end encryption, i.e., the first subscriber encrypts the message and the second subscriber decrypts the first message N1. For the encryption of the message, a homomorphous encryption method may be used. Then, for example, the telecommunications service may carry out operations on the message, for example, modify their size, without having to decrypt the message itself. The result of the operation then is also present in encrypted form.

Figure 2:
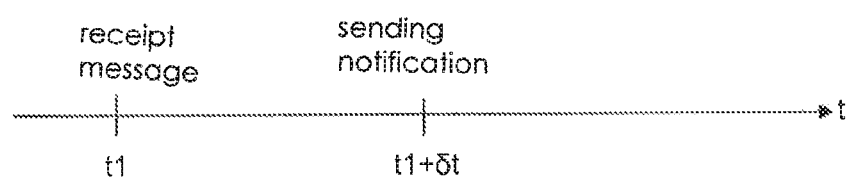
FIG. 2 shows the temporal sequence between the receipt of a message and the sending of a notification.

FIG. 2 shows the temporal sequence of the receipt of a first message N1 and the sending of a notification.

At the point of time t1, the telecommunications service of the telecommunications service provider receives a message from a first subscriber. After the receipt of the message, the telecommunications service or the notification service generates a notification for the subscriber to whom the received message is designated, and sends the notification to this subscriber, wherein a predetermined time delay δt is provided between the receipt of the message at the point of time t1 and the sending of the notification. That means, the notification is sent at the point of time t1+δt to the second subscriber.

In a simple case, a constant time delay δt may be used for all notifications to be sent. Such a constant time delay, however, has the disadvantage that it possibly may be determined on the basis of an analysis of the data traffic between the subscribers and the telecommunications service such that with knowledge of the time delay δt, again an assignment of a notification B to a received message N will be possible. In order to prevent this, a dynamic time delay is provided, which changes after a predetermined number of notifications—in the best case, after each notification. Thereby, the determination of a time delay by analysis of the data traffic, on the one hand, is substantially impeded, and, on the other hand, a determined time delay may only be used for some notifications sent in the past in order to be able to correctly assign the notifications to the respective received notifications, whereas a thus determined time delay for such an assignment of notifications to messages is useless for notifications to be sent in the future and received messages, because the current time delay already has been changed until then.

Figure 3A:
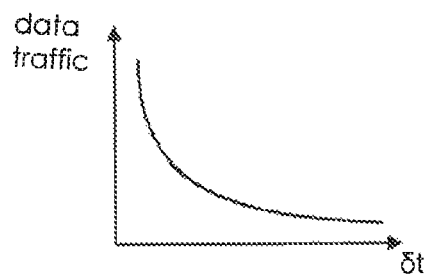
FIGS. 3a and 3b show two variants of the selection of a time delay depending on data traffic.
Figure 3B:
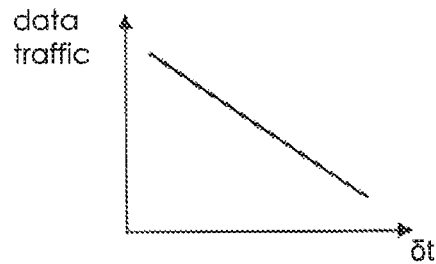

Examples for the selection of a time delay δt depending on the data traffic per time unit are shown in FIGS. 3a and 3b.

With respect to the examples shown in FIGS. 3a and 3b, the time delay is smaller for a high data traffic per time unit than for low data traffic per time unit, i.e., a smaller time delay δt may be selected for high data traffic than for lower data traffic, because higher data traffic usually involves a large number of messages of a large number of subscribers such that due to the large number of notifications sent, an assignment of a notification sent to a received message is impeded.

With respect to the example shown in FIG. 3a, the time delay δt is not dependent on the data traffic in a linear manner. Of course, also other dependencies between the time delay δt and the data traffic than the ones shown in FIGS. 3a and 3b may be selected.

According to an embodiment, the data traffic per time unit may comprise the number of messages N per time unit received.

In order to achieve even better dynamics of the selected time delay δt, it may be provided for the time delay δt necessary for the sending of a notification being selected randomly from a time delay interval. Hereby, the time delay δt may be selected from a time delay interval for a certain number of notifications to be sent. Alternatively, the time delay δt may be selected randomly from the time delay interval for each single notification to be sent. Thereby, it is achieved that even upon a comprehensive analysis of the data traffic between the subscribers and the telecommunications service, no inferences with respect to the assignment of the notifications to the received messages are possible, because, on the one hand, each time delay is subject to a certain randomness, and because, on the other hand, due to the random selection of the time delays for the notifications to be sent, the sequence of the notifications sent no longer corresponds to the sequence of the incoming messages.

The random component for the random selection of the time delay from a time delay interval may be even further improved by selecting the interval limits of the time delay interval in dependence of the data traffic per time unit between the subscribers and the telecommunications service. Thereby, it is ensured that for high data traffic, small time delays δt are selected randomly from the time delay interval, and for low data traffic, larger time delays δt are selected from the time delay interval.

According to a further embodiment, additionally or alternatively to the measures for the selection of a time delay mentioned above, the generated notifications may be queued randomly in a notification queue such that the sequence of the notifications to be sent no longer corresponds to the sequence of the received messages. When using such a queue, in which the notifications to be sent are queued randomly, the random selection of a time delay from a time delay interval may be omitted, because due to the random queuing of the notifications into the queue, also for a constant time delay it is ensured that a notification sent may not be assigned to a received message correctly.

REFERENCE NUMERALS 5 telecommunications service provider
10 telecommunications service
11 notification service
δt time delay between data receipt and sending of the notification
B notification between telecommunications service and subscriber
D data of the notification
N message between subscriber and telecommunications service
T subscriber
T1 first subscriber
T2 second subscriber
U secured environment

What is claimed is:

1. A method for transmission of messages (N1, N2) via a telecommunications network between a number of subscribers (T1, T2) by means of a telecommunications service (5, 10), wherein
    the telecommunications service (5, 10) receives a first message (N1) of individual first size (s1) of at least one first subscriber (T1) of the telecommunications service (10), which is designated for at least one second subscriber (T2) of the telecommunications service,
    the telecommunications service (5, 10), in response to the receipt of the first message (N1), sends a second message (N2) to the at least one second subscriber (T2), wherein the second message (N2) has a second size (s2), the second size having a relation (M) to the first size (s1) which is irreversibly unique, such that the size of the first message (N1) cannot unambiguously be deduced from the size of the second message (N2),
    the relation (M) represents a mapping rule, according to which the first size (s1) is mapped to a size category from a predetermined number (L) of size categories, wherein each size category comprises more than one first size (s1), and wherein the second size (s2) obtains a value (sk) from that size category, to which the first size (s1) is mapped, and
    the at least one second message (N2) has the same payload as the first message (N1).

2. The method of claim 1, wherein the value (sk) corresponds to the maximum value (skmax) of the size category.

3. The method of claim 2, wherein the number (L) of the size categories is one, and the value (sk) corresponds to the maximum size (s1_max) of the first message (N1).

4. The method of claim 1, wherein the first message (N1) is assigned to address information with respect to the at least one second subscriber (T2) only in encrypted form, which preferably only can be decrypted by the telecommunications service (10).

5. The method of claim 1, wherein the second message (N2) is assigned to information with respect to the first subscriber (T1) only in encrypted form, which preferably only can be decrypted by the at least one second subscriber (T2).

6. The method of claim 1, wherein the telecommunications service (10) operates in a secured environment (U).

7. The method of claim 1, wherein the first message (N1) is encrypted in a homomorphous manner, and the second message (N2) is also encrypted in a homomorphous manner, wherein preferably the encryption cannot be modified by the telecommunications service (10).

* * * * *